(12) United States Patent
Siu

(10) Patent No.: US 7,658,491 B2
(45) Date of Patent: Feb. 9, 2010

(54) MULTI-PURPOSE SPECTACLE FRAME SET

(76) Inventor: Yu Siu, Flat No. 3, 18 Floor, Block K, Kam Tai Court, Shatin New Territories, Hong Kong (CN)

( * ) Notice: Subject to any disclaimer, the term of this patent is extended or adjusted under 35 U.S.C. 154(b) by 15 days.

(21) Appl. No.: 12/215,128

(22) Filed: Jun. 24, 2008

(65) Prior Publication Data

US 2009/0027614 A1    Jan. 29, 2009

Related U.S. Application Data

(60) Provisional application No. 60/962,281, filed on Jul. 26, 2007.

(51) Int. Cl.
    *G02C 7/08*    (2006.01)
(52) U.S. Cl. .............................. 351/57; 351/47; 351/110
(58) Field of Classification Search .................... 351/41, 351/47, 48, 57, 110, 116, 126, 140, 141, 351/149, 152
    See application file for complete search history.

(56) References Cited

U.S. PATENT DOCUMENTS 5,896,186 A * 4/1999 Roban ......................... 351/110
2008/0198323 A1* 8/2008 Siu ............................. 351/110

* cited by examiner

*Primary Examiner*—Huy K Mai
(74) *Attorney, Agent, or Firm*—Raymond Y. Chan; David and Raymond Patent Firm

(57) ABSTRACT

A spectacle frame set includes a detachable spectacle frame and a utility spectacle frame. The detachable spectacle frame includes two hangers, a lens supporter extended between two inner sides of a pair of optical lenses, two first connectors provided at two front ends of the hangers respectively to detachably couple with two outer sides of the optical lenses respectively. The optical lenses are selectively assembled with the detachable spectacle frame or disassembled from the detachable spectacle frame to detachably mount the optical lenses behind the utility spectacle frame at a position that the optical lenses are overlapped aligned with the utility lenses of the utility spectacle frame respectively.

20 Claims, 15 Drawing Sheets

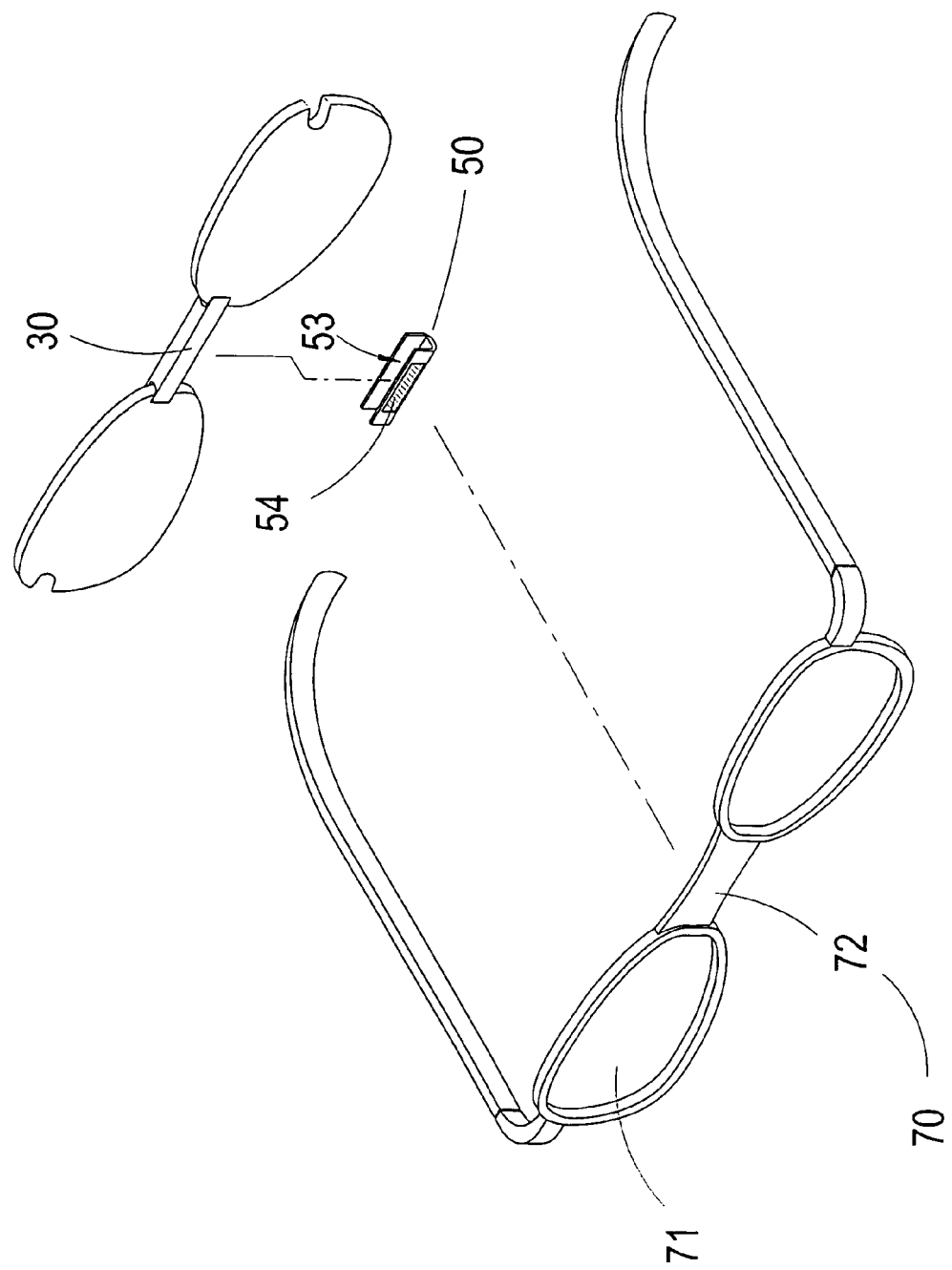

US 7,658,491 B2

MULTI-PURPOSE SPECTACLE FRAME SET

CROSS REFERENCE OF RELATED APPLICATION

This is a non-provisional application of a provisional application having an application No. 60/962,281 and a filing date of Jul. 26, 2007.

BACKGROUND OF THE PRESENT INVENTION

1. Field of Invention

The present invention provides a spectacle frame, and more particular to a multi-purpose spectacle frame set which comprises an optical spectacle frame which optical lenses can be conveniently detached from the optical frame and a utility spectacle frame to which the optical lenses detached from the optical frame can be attached thereon to provide the multi-purpose function such as sun blocking.

2. Description of Related Arts

Nowadays, sunglasses are considered as one of fashion accessories for people, wherein people have high demand for styling of sunglasses. For example, these sunglasses have curvy shape that to match with the curvature of the head of the user such that the sunglasses fit to be worn by the user. These types of sunglasses are already hard to make because of the curving shape of the lenses. In addition, these types of sunglasses are difficult and expensive to manufacture especially the sunglasses lens having the optical effect for people who needs vision correction. One option for these people is to wear a "clip on" style detachable sunglasses frame which is mounted in front of the optical lenses for providing a sunlight blocking function. Another option is to wear sun-sensor glasses that the optical lenses are automatically changed its tint to become darkest in bright sunlight and to become clear in normal light condition. The problems with the above mentioned glasses are that the sun blocking utilization quality is poor and the lens styles are very limited due to the restriction of the shape of the optical lens.

Aside from sun blocking utility like regular sunglass, there are may other applications for spectacle frame. For example, ski or snowboard users often wear anti-reflective lens, laboratory users often wear protective lenses for providing protection against various chemical materials or even explosion. A common problem for these users is that the reflective or protective lenses do not provide the optical aid for the users who needs vision correction.

SUMMARY OF THE PRESENT INVENTION

The main object of the present invention is to provide a multi-purpose spectacle frame set, wherein a user can use the same pair of optical lenses to incorporate with a regular spectacle frame or a utility spectacle frame.

Another object of the present invention is to provide a multi-purpose spectacle frame, wherein the user can conveniently interchange the optical lenses between the regular spectacle frame and the utility spectacle frame.

Another object of the present invention is to provide a multi-purpose spectacle frame, which does not involve complicated mechanical structure and can simplify the manufacturing process and maintenance cost.

Accordingly, in order to achieve the above objects, the present invention comprises a detachable spectacle frame having a plurality of hangers and a lens supporter supporting a plurality of optical lenses in front of eyes of a user, a frame adapter which is adapted to combine a utility spectacle frame with the optical lenses such that the user can conveniently uses the optical lenses for different kinds of utility spectacle frame.

These and other objectives, features, and advantages of the present invention will become apparent from the following detailed description, the accompanying drawings, and the appended claims.

BRIEF DESCRIPTION OF THE DRAWINGS

FIG. 3A is an exploded perspective view of the multi-purpose spectacle according to the above preferred embodiment of the present invention, illustrating the assembling of the utility spectacle frame by using the frame adapter.

DETAILED DESCRIPTION OF THE PREFERRED EMBODIMENT

Figure 1:
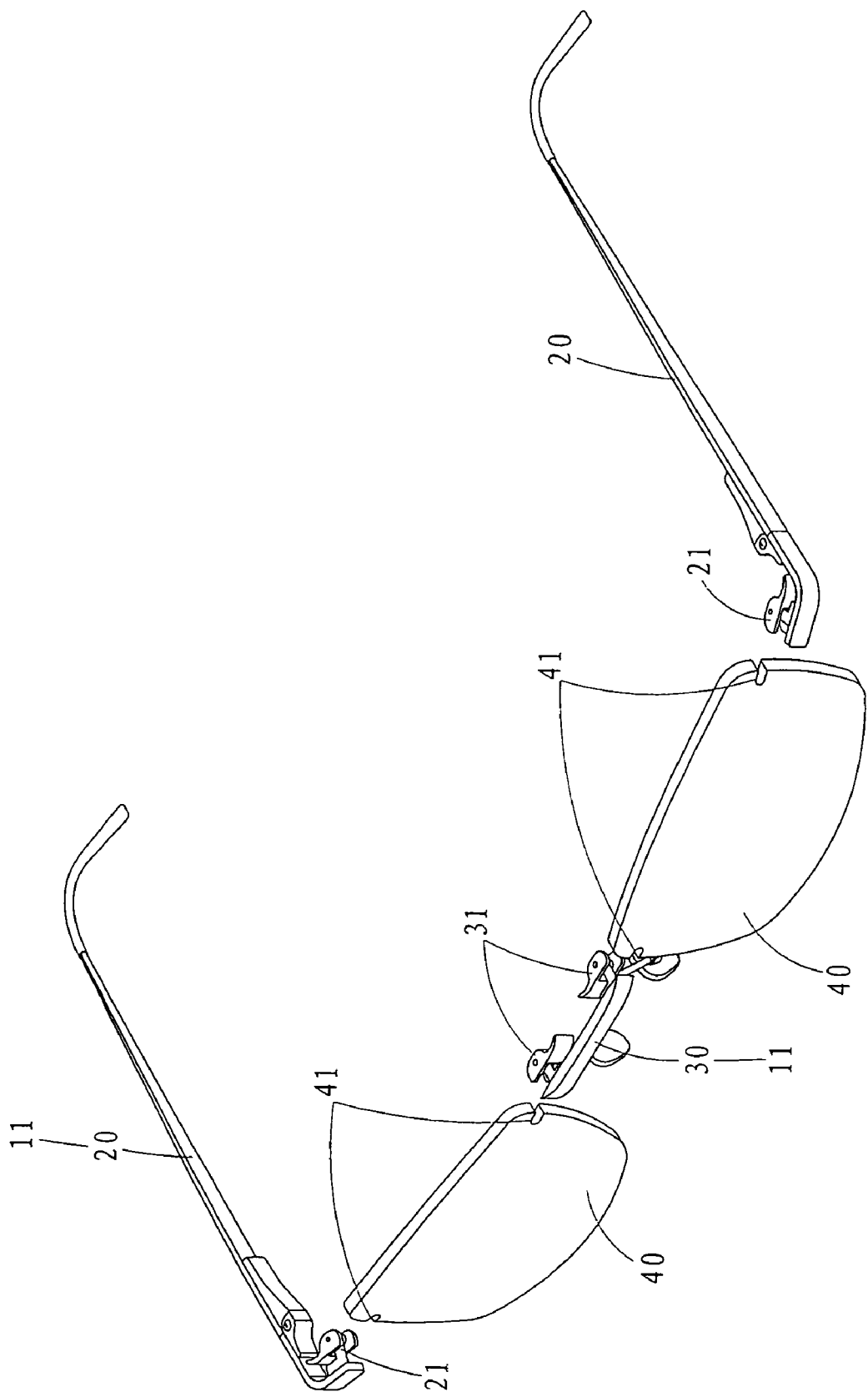
FIG. 1 is an exploded perspective view of a multi-purpose spectacle according to a preferred embodiment of the present invention, illustrating the assembling of the optical glass by using the detachable spectacle frame.

The present invention provides a multi-purpose spectacle frame set 10 which comprises a detachable spectacle frame 11 comprising a plurality of hangers 20 and a lens supporter

30. The multi-purpose spectacle frame set 10 further comprises a plurality of optical lenses 40 and a frame adapter 50. When a user wants to switch to sunglasses, the user can detach the hangers 20 and lens supporter 30 from the optical lenses 40. The optical lenses 40 can then be attached onto the frame adapter 50 which couples with a utility frame 70, such as a pair of sunglasses. Thus, the user can conveniently use the same set of optical lenses 40 for both regular optical glasses and sunglasses purposes.

According to the preferred embodiment of the present invention, the detachable spectacle frame 11 is an optical spectacle frame. The optical lenses 40 can be detached from the optical spectacle frame 11 and then detachably coupled with the utility spectacle frame 70. The utility spectacle frame 70 can be a sunglasses or a protective spectacle. In other words, the optical lenses 40 can be detachably mounted to the sunglasses or the protective spectacle such that the user does not require purchasing the sunglasses or the protective spectacle with vision correction ability.

According to the preferred embodiment, the two hangers 20 are embodied as two temple arms detachably coupling with two outer sides of the optical lenses 40 respectively. The lens supporter 30 is embodied as a bridge having two ends detachably coupling with two inner sides of the optical lenses 40 respectively.

According to FIG. 1 of the drawings, each of the optical lenses 40 has a plurality of slots 41 for connecting with the detachable optical spectacle frame 11. According to the preferred embodiment, the slots 41 are formed at the inner and outer sides of the optical lenses 40 at the peripheral edges thereof. Particularly, the slots 41 are indently formed at the peripheral edges of the optical lenses 40 at the inner and outer sides thereof.

The hangers 20 and lens supporter 30 of the detachable spectacles frame 11 further comprise a plurality of connectors 21, 31 at an end thereof corresponding to the plurality of slots 41 of the optical lenses 40. Accordingly, two first connectors 21 are provided at the front ends of the hangers 20 respectively to detachably engage with the slots 41 at the outer sides of the optical lenses 40 respectively. Two second connectors 31 are provided at the ends of the lens supporter 30 respectively to detachably engage with the slots 41 at the inner sides of the optical lenses 40 respectively.

Each of the first and second connectors 21, 31 of the hangers 20 and lens supporter 30 is slightly larger in size comparing to the slots 41 of the optical lenses 40. As shown in FIG. 1, each of the first and second connectors 21, 31 is a lens clipper detachably clipping at the peripheral edge of the optical lens 40 at the corresponding slot 41. In other words, two of the lens clippers are provided at the front ends of the hangers 20 to detachably clip at the peripheral edges of the optical lenses 40 at the outer sides thereof respectively. Another two of the lens clippers are provided at the ends of the lens supporter 30 to detachably clip at the peripheral edges of the optical lenses 40 at the inner sides thereof respectively. When assembling the optical glasses, the user can align the connectors 21, 31 with the slots 41 to detachably mount the hangers 20 and the lens supporter 30 to the optical lenses 40. By applying a pressure to unclip the connectors 21, 31, the connectors 21, 31 are disengaged with the hangers 20 and the lens supporter 30 from the slots 41 of the optical lenses 40, so as to release the set of optical lenses 40 from the detachable spectacle frame 11.

Accordingly, the first connectors 21 as the same as the second connectors 31 in which the first connectors 21 are located at different locations of the optical glasses frame to detachably couple at different locations of the optical lenses 40. Each of the first connectors 21 comprises a pressing head 211 and a resilient unit 212 provided at the front end of the respective hanger 20 and the pressing head 211 for applying a clipping force against the pressing head 211 to engage the respective optical lens 40 between the pressing head 211 and the front end of the respective hanger 20, as shown in FIG. 2C.

The resilient unit 212 comprises a housing 2121 rearwardly extended from front end of the respective hanger 20, a sliding shaft 2122 slidably extended from the housing 2121 to pivotally couple with the pressing head 211, and a resilient element 2123 disposed in the housing 2121 to apply the clipping force against the pressing head 211 through the sliding shaft 2122.

The pressing head 211 has a flat pressing surface 2111 for pressing on an inner surface of the respective optical lens 40 and a curved corner 2112 which is extended from the flat pressing surface 2111 and arranged when the pressing head 211 is pivotally turned at the curved corner 2112, the pressing head 211 is moved away from the inner surface of the respective optical lens 40 to detach the optical lens 40 from the respective connector 21.

The pressing head 211 further has an actuation tip 2113 extended from the flat pressing surface 2111 at a position opposite to the curved corner 2112, wherein the actuation tip 2113 is actuated by the user to pivotally move the flat pressing surface 2111 of the pressing head 211.

Figure 2A:
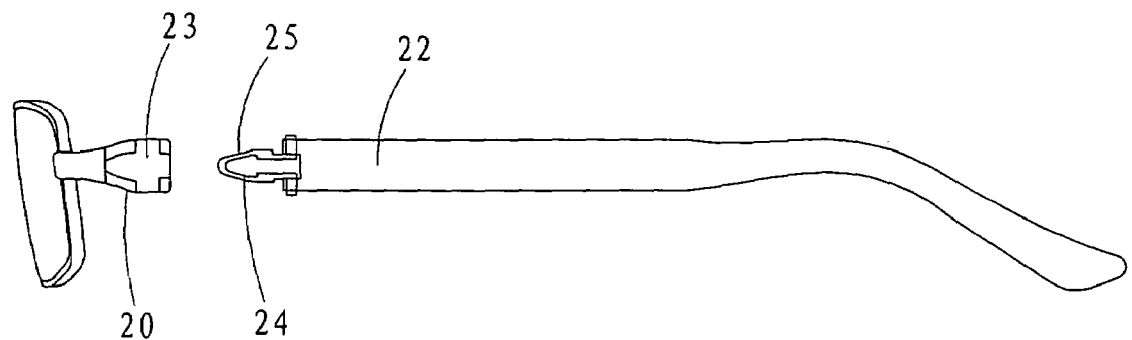
FIG. 2A is an exploded side view of the multi-purpose spectacle according to the above preferred embodiment of the present invention, illustrating the detachable temple.
Figure 2B:
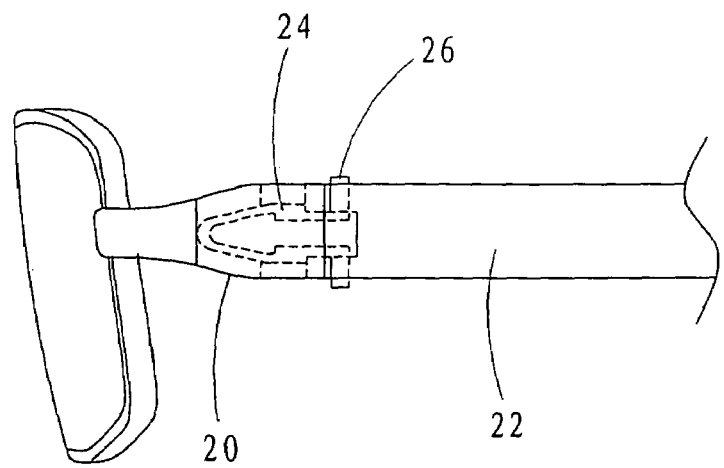
FIG. 2B is a side view of the multi-purpose spectacle according to the above preferred embodiment of the present invention, illustrating the detachable temple for the optical glass.
Figure 2C:
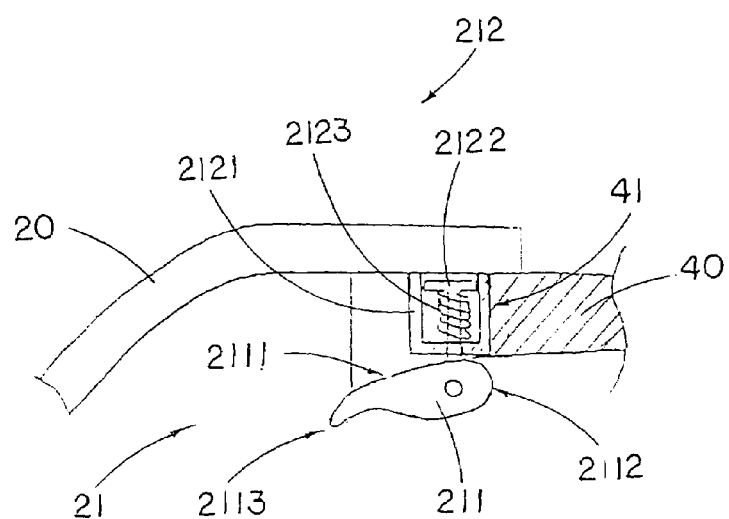
FIG. 2C is a sectional view of the first connector of the multi-purpose spectacle according to the above preferred embodiment of the present invention.
Figure 2D:
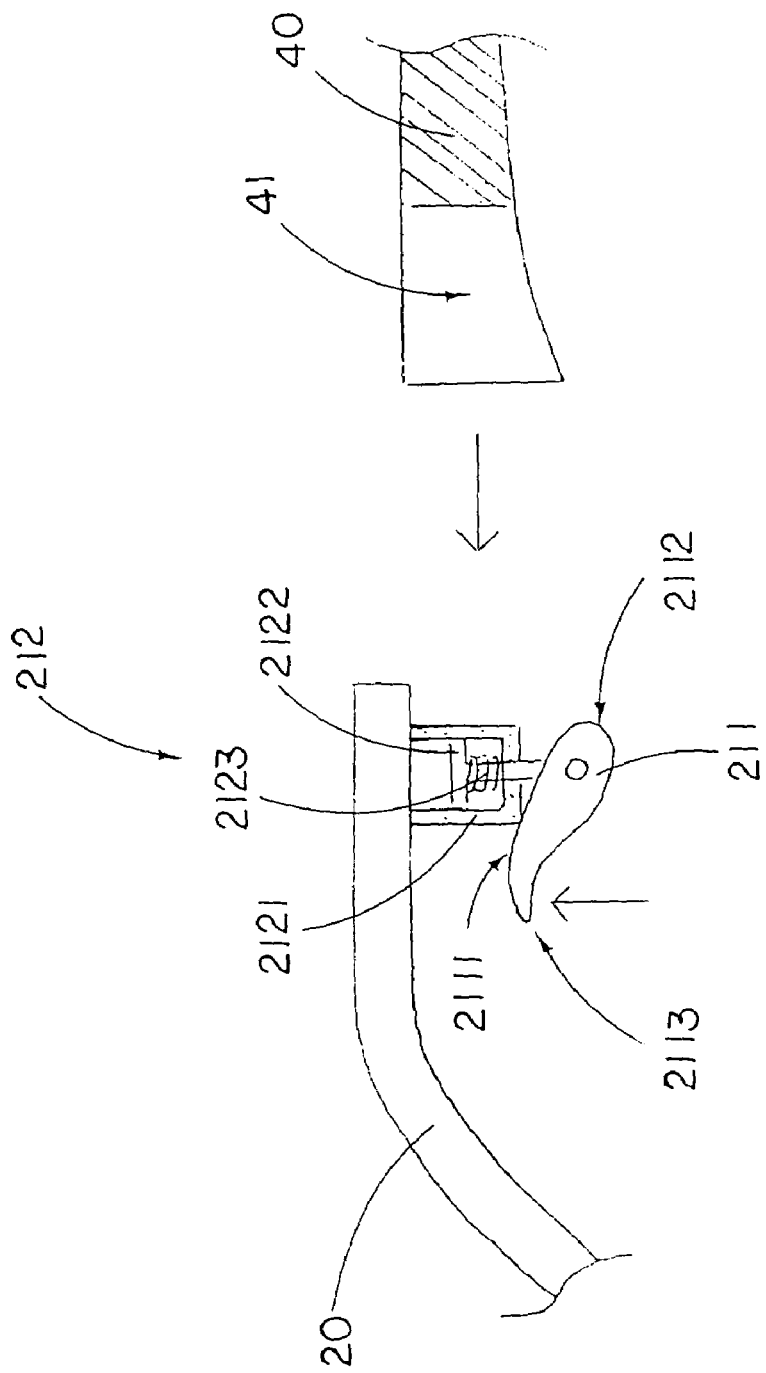
FIG. 2D illustrates the optical lens being engaged with the pressing head according to the above preferred embodiment of the present invention.

As shown in FIG. 2D, the flat pressing surface 2111 of the pressing head 211 has a predetermined curvature matching with the inner surface of the optical lens 40 such that when the flat pressing surface 2111 of the pressing head 211 is pressed against the inner surface of the optical lens 40, the optical lens 40 is substantially engaged with the pressing head 211 so as to retain the optical lens 40 in position. It is worth to mention that the optical lens 40 has a thickness gradually reducing from its peripheral edge to its center portion to create a predetermined curvature at the peripheral edge portion of the optical lens 40. Therefore, the flat pressing surface 2111 of the pressing head 211 not only matches with the curvature of the inner surface of the optical lens 40 but also flatly presses on the inner surface of the optical lens 40 to enhance the contacting area of the pressing head 211.

In order to engage the first connectors 21 (the second connectors 31) with the optical lens 40, the user is able to press the pressing head 211 at the actuation tip 2113 thereof, as shown in FIG. 2D. Therefore, the opening between the curved corner 2112 and the hanger 20 is enlarged. Then, the user is able to slidably insert the slot 41 at the peripheral edge of the optical lens 40 through the opening. Once the housing 2121 is slid into the slot 41, the resilient element 2123 will apply the clipping force against the pressing head 211 through the sliding shaft 2122 so as to substantially engage the flat pressing surface 2111 of the pressing head 211 with the inner surface of the optical lens 40. It is worth to mention that when the first connector 21 is slid at the slot 41, the pressing head 211 is automatically pulled away to stretch the resilient element 2123 for matching with the thickness of the optical lens 40.

According to FIG. 2A of the drawings, each of the hangers 20 further comprises a detachable temple 22 which extends along a temple for riding over an ear of the user when wearing the optical glasses. The hanger 20 has a front portion detachably coupled with the respective optical lens 40 at the outer side thereof, wherein the front portion has a hollow structure at an end and forms a receiving cavity 23 to couple with the detachable temple 22. A connecting end 25 of the detachable temple 22 has an inserting element 24 which is fittedly inserted into the receiving cavity 23 of the hanger 20 as shown in FIG. 2B of the drawings. Accordingly, the inserting element 24 has an arrow head shape and is made of elastic material. The inserting element 24 of the detachable temple 22 further comprises a spring 26 which the user can conveniently press by the fingers to temporary deform the shape of the inserting element 24 which allow the inserting element 24 to disengage with the hanger 20.

FIG. 3A of the drawings illustrates the preferred embodiment of the present invention. After the hangers 20 are detached from the optical lenses 40, the lens supporter 30 is adapted to detachably mount to the utility spectacle frame 70 via the frame adapter 50.

The utility spectacle frame 70 comprises a set of utility lenses 71 and a supporting frame 72 extended between two inner sides of the utility lenses 71 to firmly support the utility lenses 71 such that the user can comfortably wear the utility spectacle frame 70 using the optical lenses 40 simultaneously according to the embodiment of the present invention.

The frame adapter 50, having a U-shaped cross section, is used to assemble the optical lenses 40 and the utility spectacle frame 70. The frame adapter 50, which is made of flexible material such as a thin metal, has an elongated slot 53 which is slightly smaller than a thickness of the lens supporter 30. When attaching the frame adapter 50 onto the lens supporter 30, the user can align and assemble the elongated slot 53 with the lens supporter 30 together by sliding a bottom side of the lens supporter 30 into the elongated slot 53 of the frame adapter 50. An affixing layer 54 is provided at a front side of the frame adapter 50 to affix the frame adapter 50 at the rear side of the supporting frame 72 so as to retain the frame adapter 50 at the rear side of the supporting frame 72.

Therefore, after the hangers 20 are detached from the optical lenses 40 while the lens supporter 30 is remained in between the optical lenses 40, the lens supporter 30 can mounted behind the utility spectacle frame 70 by slidably engaging the lens supporter 30 with the frame adapter 50 so as to overlappedly align the optical lenses 40 with the utility lenses 71 from behind.

According to the preferred embodiment of the present invention as shown in FIG. 3A of the drawings, when the user wants to use the multi-purpose spectacle frame set as the sunglasses, the user can assemble the lens supporter 30 with the optical lenses 40 first. And then, the user can connect the lens supporter 30 with the sunglasses utility spectacle frame 70 as shown in FIG. 3A of the drawings by means of the frame adapter 50.

Figure 3B:
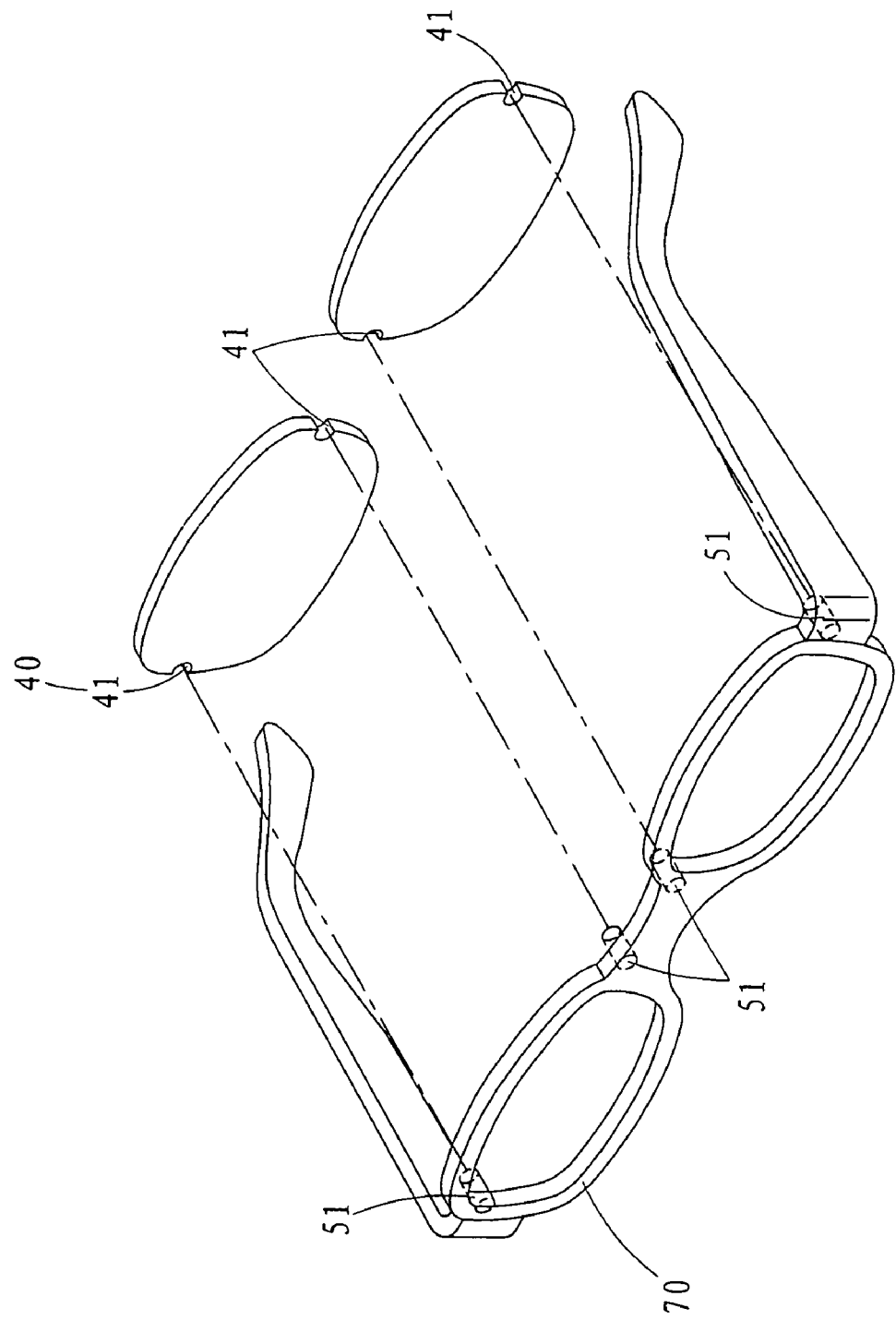
FIG. 3B is an exploded perspective view of the multi-purpose spectacle according to the above preferred embodiment of the present invention, illustrating the assembling of the utility spectacle frame without using the frame adapter.

FIG. 3B of the drawings illustrates an alternative embodiment of the present invention. A plurality of engaging elements 51 is rearwardly extended at various locations on the utility spectacle frame 70. Accordingly, two engaging elements 51 are located at the inner sides of the utility spectacle frame 70 to engage with the inner sides of the optical lenses 40 respectively. Another two engaging elements 51 are located at the outer sides of the utility spectacle frame 70 to engage with the outer sides of the optical lenses 40 respectively. In addition, each of the engaging elements 51 is made of deformable material. The engaging elements 51 have a size which is slightly larger than the plurality of slots 41 of the optical lenses 40 such that the engaging elements 51 are capable of firmly engaging with the plurality of slots 41 of the optical lenses 40. Thus, the optical lenses 40 can be conveniently and firmly attached onto the utility spectacle frame 70 without using the frame adapter 50 as shown in the preferred embodiment above. In other words, after the hangers 20 and the lens supporter 30 are detached from the optical lenses 40, the two optical lenses 40 can detachably mounted behind the utility spectacle frame 70 to align with the utility lenses 71 via the engaging elements 51.

Figure 4A:
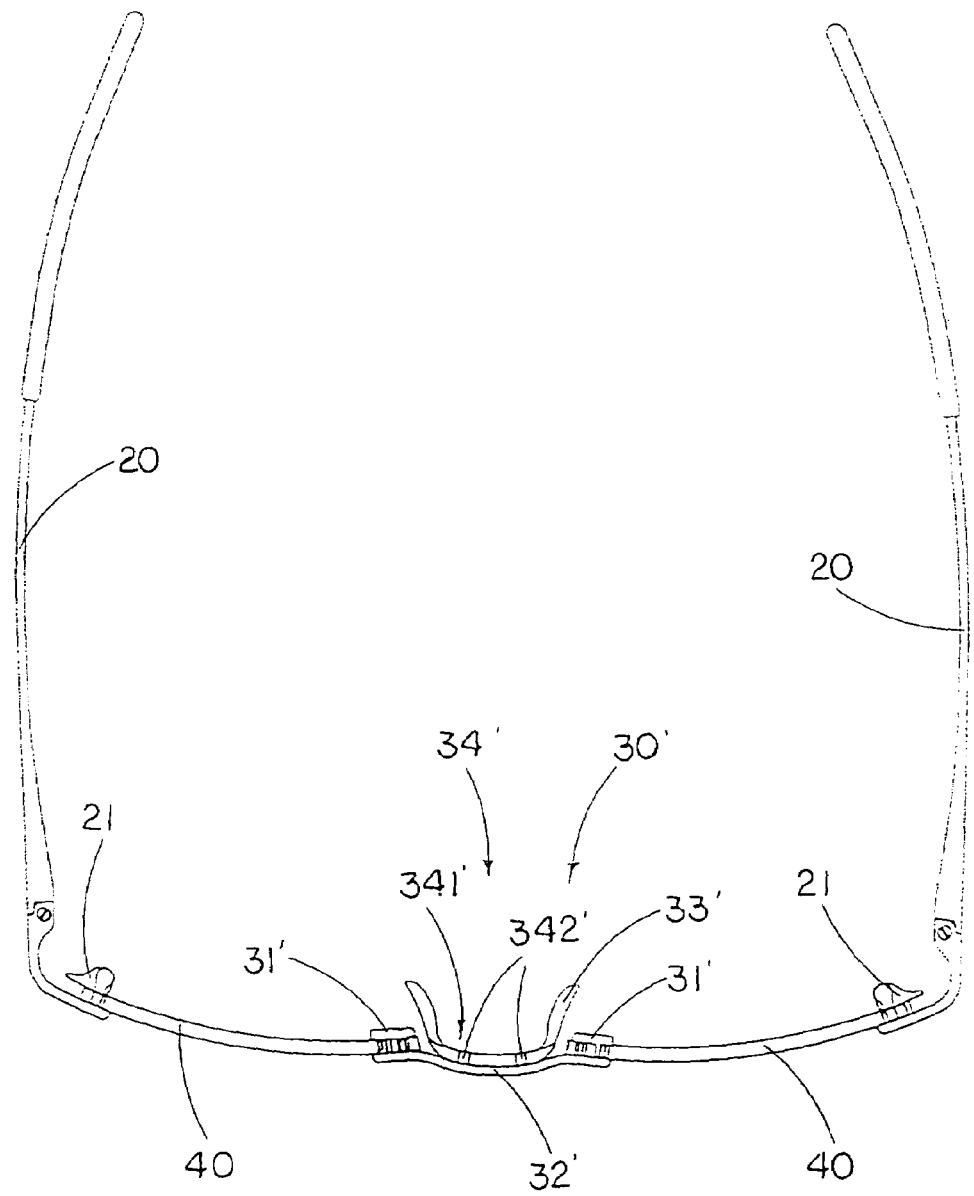
FIGS. 4A and 4B illustrate an alternative mode of the lens supporter according to the above preferred embodiment of the present invention.
Figure 4B:
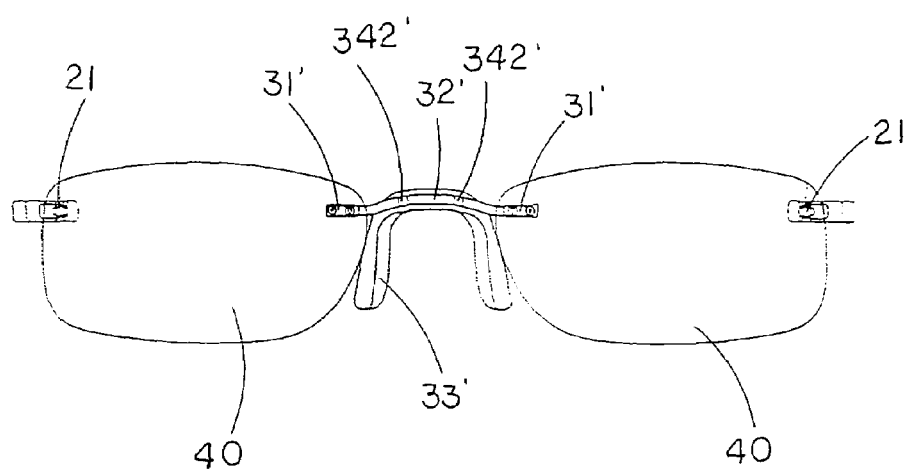

As shown in FIGS. 4A and 4B, the second connectors 31' are two pin lockers provided at two ends of the lens supporter 30' to securely lock at the two inner sides of the optical lenses 40' respectively, so as to securely lock up the lens supporter 30' between the two inner sides of the optical lenses 40.

Accordingly, the lens supporter 30' comprises a lens bridge 32' engaging between the two inner sides of the optical lenses 40 via the second connectors 31' respectively, a nose support 33' downwardly extended from the lens bridge 32' for supporting on a nose of the user, and a detachable coupler 34' detachably coupling the nose support 33' with the lens bridge 32' so as to enable the nose support 33' being detached from the lens bridge 32'.

As shown in FIGS. 4A and 4B, the detachable coupler 34' contains two coupling slots 341' spacedly provided at the nose support 33' and two spaced apart coupling inserters 342' rearwardly extended from the lens bridge 32' to detachably insert into the coupling slots 341' respectively. Therefore, the user is able to detachably mount the nose support 33' to the lens bridge 32' by slidably inserting the coupling inserters 342' into the coupling slots 341'.

Figure 5:
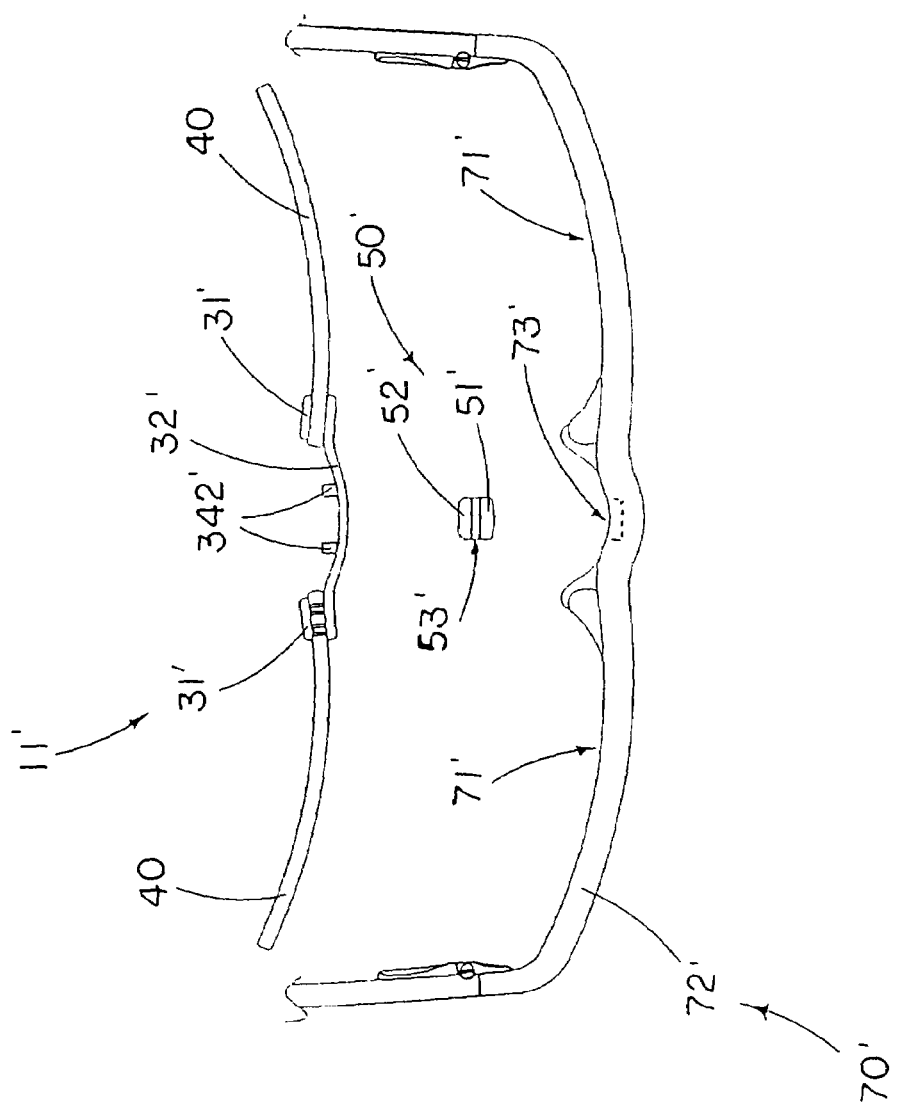
FIG. 5 illustrates the optical lenses with the alternative lens supporter for mounting behind the utility spectacle frame by using the frame adapter.

As shown in FIG. 5, the optical lenses 40 are adapted to mount behind the utility spectacle frame 70'. Accordingly, the two first connectors 21 are released such that the two hangers 20 are detached from the two outer sides of the optical lenses 40. In addition, the nose support 33' is also detached from the lens bridge 32' by slidably pulling the coupling inserters 342' out of the coupling slots 341' respectively. Therefore, the optical spectacle frame 11', as shown in FIG. 5, only contains the optical lenses 40 and the lens bridge 32'. The optical spectacle frame 11' is adapted to mount behind the utility spectacle frame 70' via the frame adapter 50'.

Figure 7:
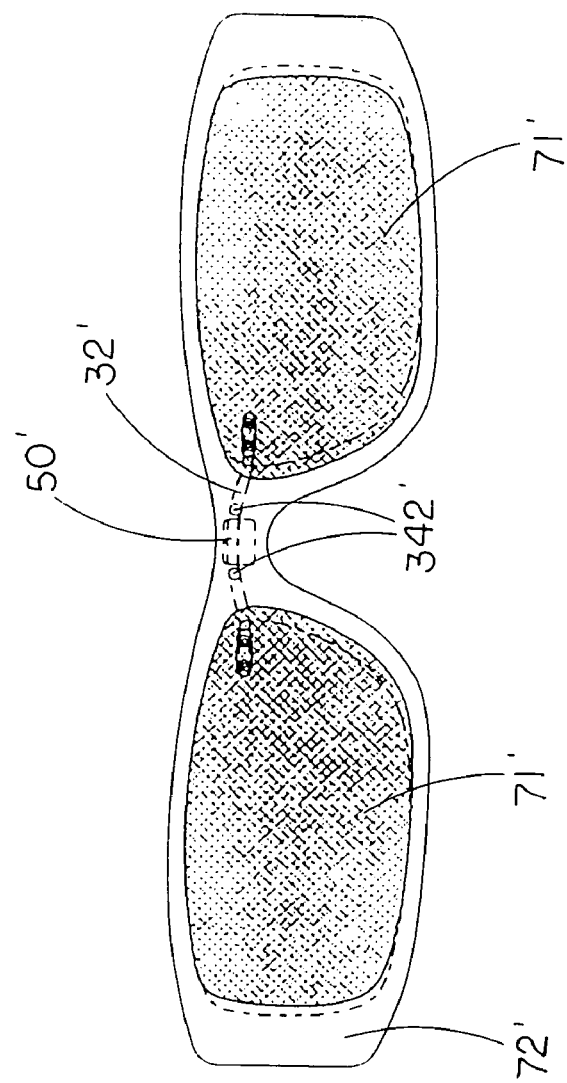
FIG. 7 is a front view of the utility spectacle frame with the optical lenses mounted therebehind according to the above preferred embodiment of the present invention.

As it is mentioned above that the utility spectacle frame 70' comprises two utility lenses 71' and a supporting frame 72' extended between two inner sides of the utility lenses 71' to firmly support the utility lenses 71'. As shown in FIG. 7, the utility lenses 71' are two sunglasses lenses respectively. As shown in FIG. 5, the utility spectacle frame 70' further contains a retention slot 73' indently provided at an inner side of the supporting frame 72' at a position between the utility lenses 71'.

The frame adapter 50' has a front inserting portion 51' detachably coupling with the retention slot 73', a rear supporting portion 52' rearwardly extended from the front inserting portion 51', and an elongated slot 53' indently formed between the front inserting portion 51' and the rear supporting portion 52' for engaging with the lens bridge 32' of the optical spectacle frame 11'.

Figure 6:
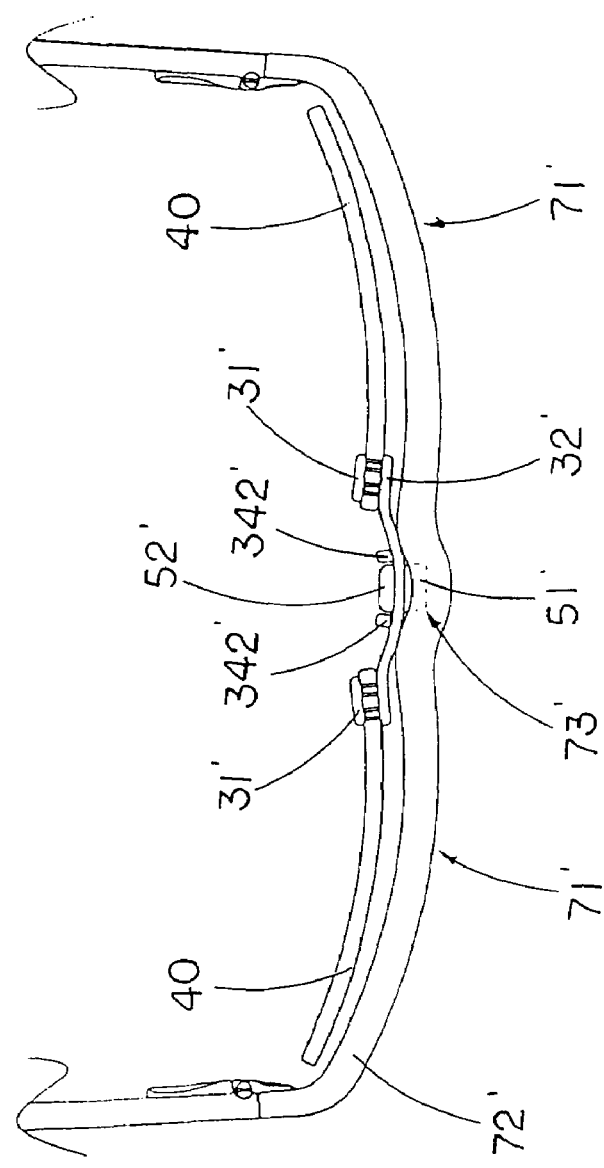
FIG. 6 illustrates the optical lenses being mounted behind the utility spectacle frame according to the above preferred embodiment of the present invention.

As shown in FIGS. 6 and 7, the lens bridge 32' is dropped down to engage with the elongated slot 53' of the frame adapter 50' after the front inserting portion 51' thereof is engaged with the retention slot 73' such that the optical lenses 40 are aligned with the utility lenses 71' from behind respectively.

In addition, the frame adapter 50' has a width slightly smaller than a distance between the coupling inserters 342' such that when the lens bridge 32' is engaged with the elongated slot 53', the coupling inserters 342' are engaged with two side ends of the frame adapter 50' so as to ensure the engagement between the utility spectacle frame 70' and the optical spectacle frame 11'. As shown in FIG. 6, the coupling inserters 342' are engaged with two side ends of the rear supporting portion 53' of the frame adapter 50'. In other words, the utility spectacle frame 70' and the optical spectacle frame 11' are interlocked with each other by engaging the lens bridge 32' with the elongated slot 53' and by engaging the coupling inserters 342' with two side ends of the frame adapter 50'. Therefore, the optical spectacle frame 11' can be stably supported behind the utility spectacle frame 70'.

Figure 8:
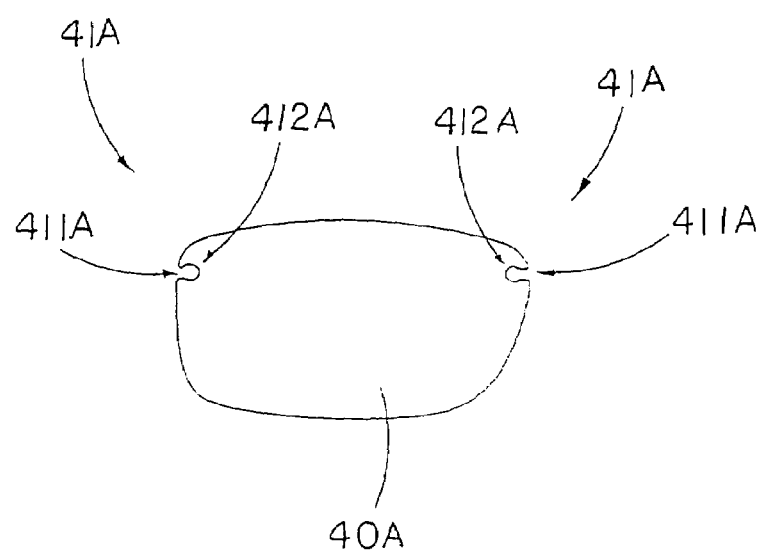
FIG. 8 illustrates an alternative mode of the slots of the optical lens according to the above preferred embodiment of the present invention.
Figure 9:
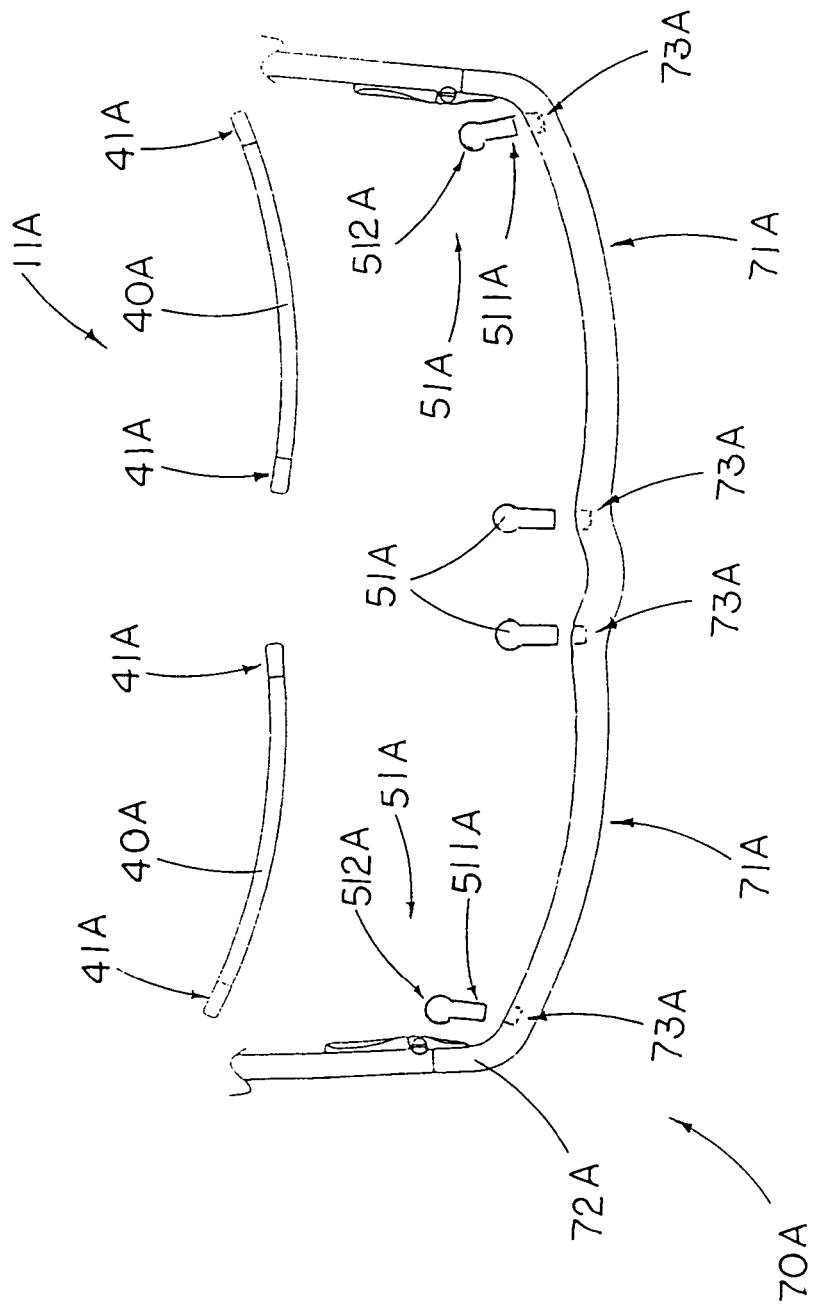
FIG. 9 illustrates the optical lenses with the engaging elements for mounting behind the utility spectacle frame.

FIGS. 8 to 11 illustrate an alternative assembling structure of the present invention. As shown in FIG. 9, the optical spectacle frame 11A is supported behind the utility spectacle frame 70A via a plurality of engaging elements 51A, wherein the optical spectacle frame 11A contains only two optical lenses 40A by disassembling the rest components. Accordingly, the engaging elements 51A are rearwardly extended at various locations on the utility spectacle frame 70A. In particularly, two engaging elements 51A are located at the inner sides of the utility spectacle frame 70A to engage with the inner sides of the optical lenses 40A respectively. Another two engaging elements 51A are located at the outer sides of the utility spectacle frame 70A to engage with the outer sides of the optical lenses 40A respectively.

Figure 10:
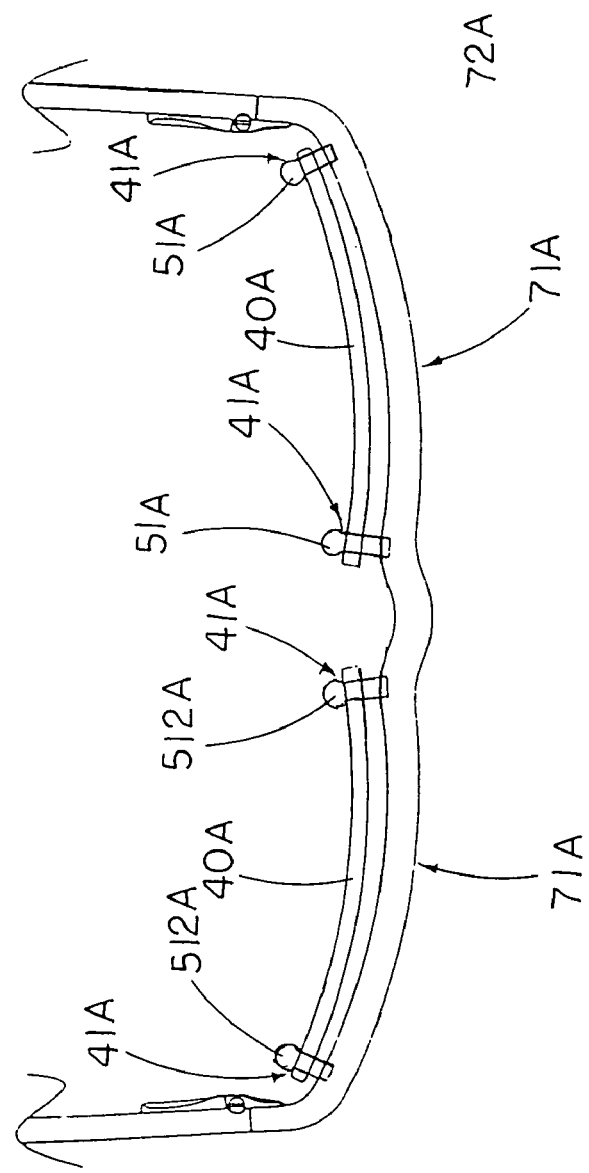
FIG. 10 illustrates the optical lenses being mounted behind the utility spectacle frame by using the engaging elements according to the above preferred embodiment of the present invention.
Figure 11:
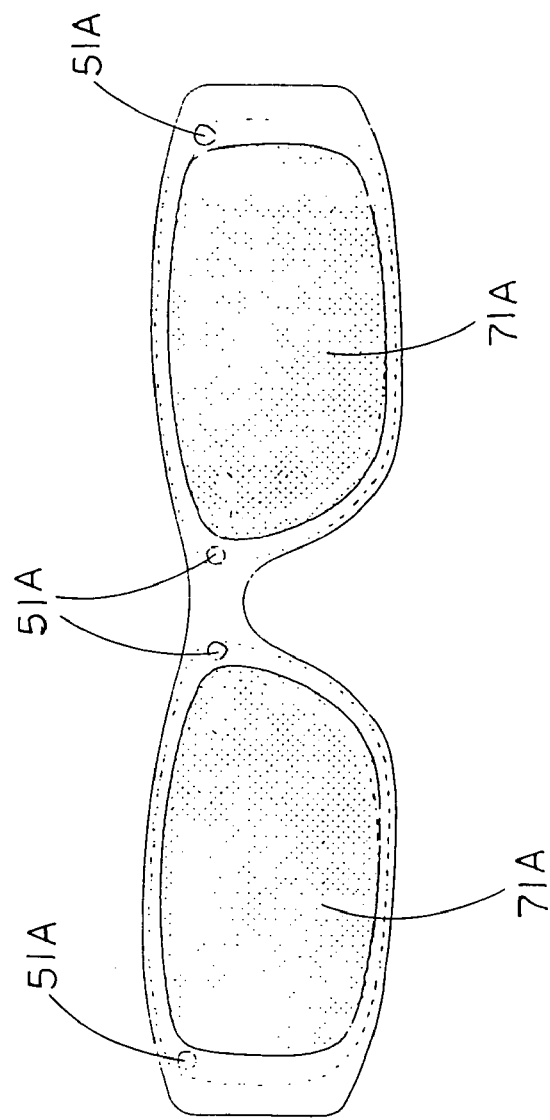
FIG. 11 is a front view of the utility spectacle frame with the optical lenses mounted therebehind by using the engaging elements according to the above preferred embodiment of the present invention.

The utility spectacle frame 70A contains four retention slots 73A indently provided at an inner side of the supporting frame 72A at a position that two retention slots 73A are located close to the inner sides of the utility lenses 71A respectively and two retention slots 73A are located close to the outer sides of the utility lenses 71A respectively. Each of the engaging elements 51A has a front inserting end 511A detachably inserting into the one of the retention slots 73A and a rear coupling end 512A detachably engaging with the corresponding slot 41A of the optical lens 40A so as to detachably hold the optical lens 40A behind the utility spectacle frame 70A to align with the respective utility lens 71A, as shown in FIGS. 10 and 11. As shown in FIG. 9, the front inserting end 511A of each of the engaging elements 51A has an elongated structure while the rear coupling end 512A of each of the engaging elements 51A has an enlarged structure.

As shown in FIG. 8, two slots 41A are formed at the inner and outer sides of each of the optical lens 40A respectively, wherein each of the slots 41A has a narrow neck portion 411A extended from the peripheral edge of the optical lens 40A and an enlarged head portion 412A extended from the narrow neck portion 411A. Therefore, when the rear coupling end 512A of each of the engaging elements 51A is slidably engaged with the head portion 412A of the respective slot 41A through the neck portion 411A thereof, the engaging element 51A is securely locked at the slot 41A to retain the optical lens 40A in position, as shown in FIGS. 10 and 11.

It is worth to mention that the user is able to keep the optical lenses 40 to incorporate with other utility spectacle frame 70 without modifying the utility lenses 71 for vision correction.

The above description has illustrated that the utility spectacle frame 70 has a sun blocking lenses for sunlight blocking or fashion purposes. The utility spectacle frame 70 could also provide other types of utility lenses according to the requirement of different situations. The utility spectacle frame 70 can have protective lenses providing protection against physical impact or chemical solutions in a laboratory testing situation. The utility spectacle frame 70 can also have anti-reflective and anti-fog lenses for winter sports user.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A spectacle frame set, comprising:
   a set of optical lenses;
   a detachable spectacle frame comprising two hangers and a lens supporter extended between two inner sides of said optical lenses, wherein two first connectors are provided at two front ends of said hangers respectively to detachably couple with two outer sides of said optical lenses respectively; and
   a utility spectacle frame having two utility lenses and a supporting frame extended between two inner sides of said utility lenses, wherein said optical lenses are selectively assembled with said detachable spectacle frame to form a pair of optical spectacles, wherein said optical lenses are capable of being disassembled from said detachable spectacle frame to detachably mount behind said utility spectacle frame at a position that said optical lenses are overlapped aligned with said utility lenses respectively.

2. The spectacle frame set, as recited in claim 1, wherein said first connectors are two lens clippers provided at said front ends of said hangers to detachably clip at peripheral edges of said optical lenses at said outer sides thereof.

3. The spectacle frame set, as recited in claim 2, wherein two slots are indently formed at said peripheral edges of said optical lenses at said outer sides thereof for said first connectors detachably coupling thereat respectively.

4. The spectacle frame set, as recited in claim 3, further comprising a U-shaped frame adapter adapted for affixing to a rear side of said supporting frame of said utility spectacle frame, wherein said frame adapter has an elongated slot defining a width slightly smaller than a thickness of said lens supporter, wherein after said hangers are detached from said optical lenses respectively, said lens supporter is slidably engaged with said elongated slot of said frame adapter for retaining said optical lenses being aligned with said utility lenses from behind respectively.

5. The spectacle frame set, as recited in claim 4, wherein an affixing layer is provided at a front side of said frame adapter for affixing said frame adapter at said rear side of said supporting frame.

6. The spectacle frame set, as recited in claim 5, wherein each of said hangers comprises a front portion detachably coupled with said respective optical lens and a detachable temple detachably coupled with said front portion, wherein said front portion has a hollow structure at an end thereof and forms a receiving cavity, wherein a connecting end of said detachable temple has an arrow-shaped inserting element slidably inserted into said receiving cavity of said front portion to detachably couple said detachable temple with said front portion.

7. The spectacle frame set, as recited in claim 6, wherein said inserting element is made of elastic material adapted to be deformed to fit into said receiving cavity and to be disengaged from said front portion.

8. The spectacle frame set, as recited in claim 1, wherein each of said hangers comprises a front portion detachably coupled with said respective optical lens and a detachable temple detachably coupled with said front portion, wherein said front portion has a hollow structure at an end thereof and forms a receiving cavity, wherein a connecting end of said detachable temple has an arrow-shaped inserting element slidably inserted into said receiving cavity of said front portion to detachably couple said detachable temple with said front portion.

9. The spectacle frame set, as recited in claim 1, further comprising two second connectors, which have the same structure of said first connector, provided at two ends of said lens supporter to detachably couple with said two inner sides of said optical lenses respectively.

10. The spectacle frame set, as recited in claim 9, wherein four slots are indently formed at said peripheral edges of said optical lenses at said outer and inner sides thereof for said first and second connectors detachably coupling thereat respectively.

11. The spectacle frame set, as recited in claim 10, wherein said first and second connectors are four lens clippers, wherein two of said lens clippers are provided at said front ends of said hangers to detachably clip at peripheral edges of said optical lenses at said outer sides thereof, wherein another two of said lens clippers are provided at said ends of said lens supporter to detachably clip at said peripheral edges of said optical lenses at said inner sides thereof.

12. The spectacle frame set, as recited in claim 11, further comprising four engaging elements rearwardly extending from said utility spectacle frame, wherein after said hangers and said lens supporter are detached from said optical lenses, said engaging elements are detachably engaged with said peripheral edges of said optical lenses at said slots respectively for retaining said optical lenses being aligned with said utility lenses from behind respectively.

13. The spectacle frame set, as recited in claim 12, wherein each of said engaging elements has an elongated front inserting end detachably coupling with said utility spectacle frame and an enlarged rear coupling end slidably engaging with said respective slot of said optical lens so as to retain said optical lens in position.

14. The spectacle frame set, as recited in claim 13, wherein each of said slots has a narrow neck portion extended from said peripheral edge of said optical lens and an enlarged head portion extended from said narrow neck portion, such that said rear coupling end of each of said engaging elements is securely locked at said head portion of said respective slot in a slidably detachable manner.

15. The spectacle frame set, as recited in claim 9, wherein each of said hangers comprises a front portion detachably coupled with said respective optical lens and a detachable temple detachably coupled with said front portion, wherein said front portion has a hollow structure at an end thereof and forms a receiving cavity, wherein a connecting end of said detachable temple has an arrow-shaped inserting element slidably inserted into said receiving cavity of said front portion to detachably couple said detachable temple with said front portion, wherein said inserting element is made of elastic material adapted to be deformed to fit into said receiving cavity and to be disengaged from said front portion.

16. The spectacle frame set, as recited in claim 15, wherein each of said hangers comprises a front portion detachably coupled with said respective optical lens and a detachable temple detachably coupled with said front portion, wherein said front portion has a hollow structure at an end thereof and forms a receiving cavity, wherein a connecting end of said detachable temple has an arrow-shaped inserting element slidably inserted into said receiving cavity of said front portion to detachably couple said detachable temple with said front portion, wherein said inserting element is made of elastic material adapted to be deformed to fit into said receiving cavity and to be disengaged from said front portion.

17. The spectacle frame set, as recited in claim 9, wherein said lens supporter comprises a lens bridge engaging between said two inner sides of said optical lenses via said second connectors respectively, a nose support downwardly extended from said lens bridge, and a detachable coupler detachably coupling said nose support with said lens bridge.

18. The spectacle frame set, as recited in claim 17, wherein said detachable coupler contains two coupling slots spacedly provided at said nose support and two spaced apart coupling inserters rearwardly extended from said lens bridge to detachably insert into said coupling slots respectively.

19. The spectacle frame set, as recited in claim 18, further comprising a frame adapter, wherein said frame adapter has a front inserting portion detachably coupling with a rear side of said supporting frame of said utility spectacle frame, a rear supporting portion rearwardly extended from said front inserting portion, and an elongated slot indently formed between said front inserting portion and said rear supporting portion for engaging with said lens bridge.

20. The spectacle frame set, as recited in claim 19, wherein said frame adapter has a width slightly smaller than a distance between said coupling inserters, such that when said lens bridge is engaged with said elongated slot, said coupling inserters are engaged with two side ends of said frame adapter.

* * * * *